United States Patent
Li et al.

(10) Patent No.: US 9,602,208 B2
(45) Date of Patent: Mar. 21, 2017

(54) CONTENT DISTRIBUTION SYSTEM

(71) Applicant: Broadcom Corporation, Irvine, CA (US)

(72) Inventors: Yong Li, San Diego, CA (US); Xuemin Chen, Rancho Santa Fe, CA (US)

(73) Assignee: BROADCOM CORPORATION, Irvine, CA (US)

( * ) Notice: Subject to any disclaimer, the term of this patent is extended or adjusted under 35 U.S.C. 154(b) by 241 days.

(21) Appl. No.: 13/948,099

(22) Filed: Jul. 22, 2013

(65) Prior Publication Data

US 2015/0016821 A1    Jan. 15, 2015

Related U.S. Application Data

(60) Provisional application No. 61/845,912, filed on Jul. 12, 2013.

(51) Int. Cl.
*H04B 10/04*    (2006.01)
*H04B 10/12*    (2006.01)
*H04B 10/2575*    (2013.01)

(52) U.S. Cl.
CPC .............................. *H04B 10/25751* (2013.01)

(58) Field of Classification Search
CPC ............ H04L 67/1031; H04L 41/0896; H04N 21/438; H04N 21/437; H04N 21/44; H04N 21/245
See application file for complete search history.

(56) References Cited

U.S. PATENT DOCUMENTS

| | | | |
|---|---|---|---|
| 6,607,136 B1 * | 8/2003 | Atsmon et al. | 235/492 |
| 2009/0316715 A1 * | 12/2009 | Saniee | H04N 7/17336 370/429 |
| 2010/0250772 A1 * | 9/2010 | Mao | H04N 21/222 709/231 |
| 2010/0274760 A1 * | 10/2010 | Diot et al. | 707/627 |
| 2010/0313235 A1 * | 12/2010 | Straub | 725/131 |
| 2011/0153864 A1 * | 6/2011 | Prasad et al. | 709/242 |
| 2012/0159558 A1 * | 6/2012 | Whyte | H04N 21/222 725/95 |
| 2012/0203825 A1 * | 8/2012 | Choudhary et al. | 709/203 |
| 2012/0265856 A1 * | 10/2012 | Major et al. | 709/219 |
| 2012/0291083 A1 * | 11/2012 | White | H04N 21/6405 725/111 |

(Continued)

*Primary Examiner* — Nasim Nirjhar
(74) *Attorney, Agent, or Firm* — McDermott Will & Emery LLP

(57) ABSTRACT

A content distribution system may include a headend server and media converters, the headend server being configured to distribute content items to user devices via the media converters and gateway devices. Each of the media converters may include a media converter cache and may be coupled to the headend server and a subset of the gateway devices, where each of the user devices is communicatively coupled to one of the gateway devices. The headend server may be further configured to determine one of the content items that is expected to be requested by a group of the user devices, determine one of the media converters that is coupled, via the subset of the gateway devices, to a largest number of user devices in the group of the user devices, and coordinate storing the one of the content items in the media converter cache of the one of the media converters.

20 Claims, 9 Drawing Sheets

(56) References Cited

U.S. PATENT DOCUMENTS

| | | | |
|---|---|---|---|
| 2013/0070640 A1* | 3/2013 | Chapman | H04L 12/2801 370/254 |
| 2013/0104175 A1* | 4/2013 | Applegate | H04N 21/231 725/87 |
| 2013/0144983 A1* | 6/2013 | Vantalon | H04L 67/26 709/219 |
| 2014/0173029 A1* | 6/2014 | Varney et al. | 709/217 |
| 2014/0310374 A1* | 10/2014 | Lee et al. | 709/213 |

\* cited by examiner

CONTENT DISTRIBUTION SYSTEM

CROSS-REFERENCE TO RELATED APPLICATIONS

The present application claims the benefit of U.S. Provisional Patent Application Ser. No. 61/845,912, entitled "Content Distribution System," filed on Jul. 12, 2013, which is hereby incorporated by reference in its entirety for all purposes.

TECHNICAL FIELD

The present description relates generally to a content distribution system, and more particularly, but not exclusively, to a content distribution system on a hierarchical tree network arrangement.

BACKGROUND

As population densities increase in urban areas, broadband service providers are moving fiber optic network endpoints closer to buildings (or areas) that are associated with high population densities, such as into the basements of multi-dwelling units (MDUs). For example, a broadband service provider may place fiber optic network endpoints, e.g. optical network terminals (ONTs), in the basements of large high-rise apartment buildings that include several apartments. The broadband service provider's headend may include an optical line terminal (OLT) that is communicatively coupled to the ONTs, e.g. via fiber optic cables. The ONTs may be individually coupled, via a non-optical network medium, such as a coaxial transmission line, to gateway devices that are located in, and provide broadband service (e.g. television, telephone, and/or Internet) to, user devices in the individual dwelling units. The user devices may include, e.g. set-top boxes, mobile phones, tablet devices, etc. Thus, the ONTs may each include, and/or may be coupled to, a media converter that converts optical signals received over the fiber optic network from the OLT of the headend to electric signals that can be transmitted over the non-optical network medium (such as coax cable) to the gateways in the individual dwelling units, and vice-versa. Alternatively, a media converter may act as a layer-2 bridge, which receives the data packets from the OLT of the headend and bridges the received data packets over the non-optical network medium (such as coax cable) to the gateways, and vice-versa.

The OLT/ONTs/media converters, gateway devices, and user devices may be arranged in a hierarchical tree network arrangement that may be beneficial for broadcast transmissions from the headend to the user devices, e.g. a single transmission that is being transmitted from the headend to multiple user devices. However, the hierarchical tree network arrangement may result in network congestion when multiple simultaneous unicast transmissions are being transmitted from the headend to the user devices, e.g. when the user devices are simultaneously accessing adaptive bit rate (ABR) streaming content from the headend

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
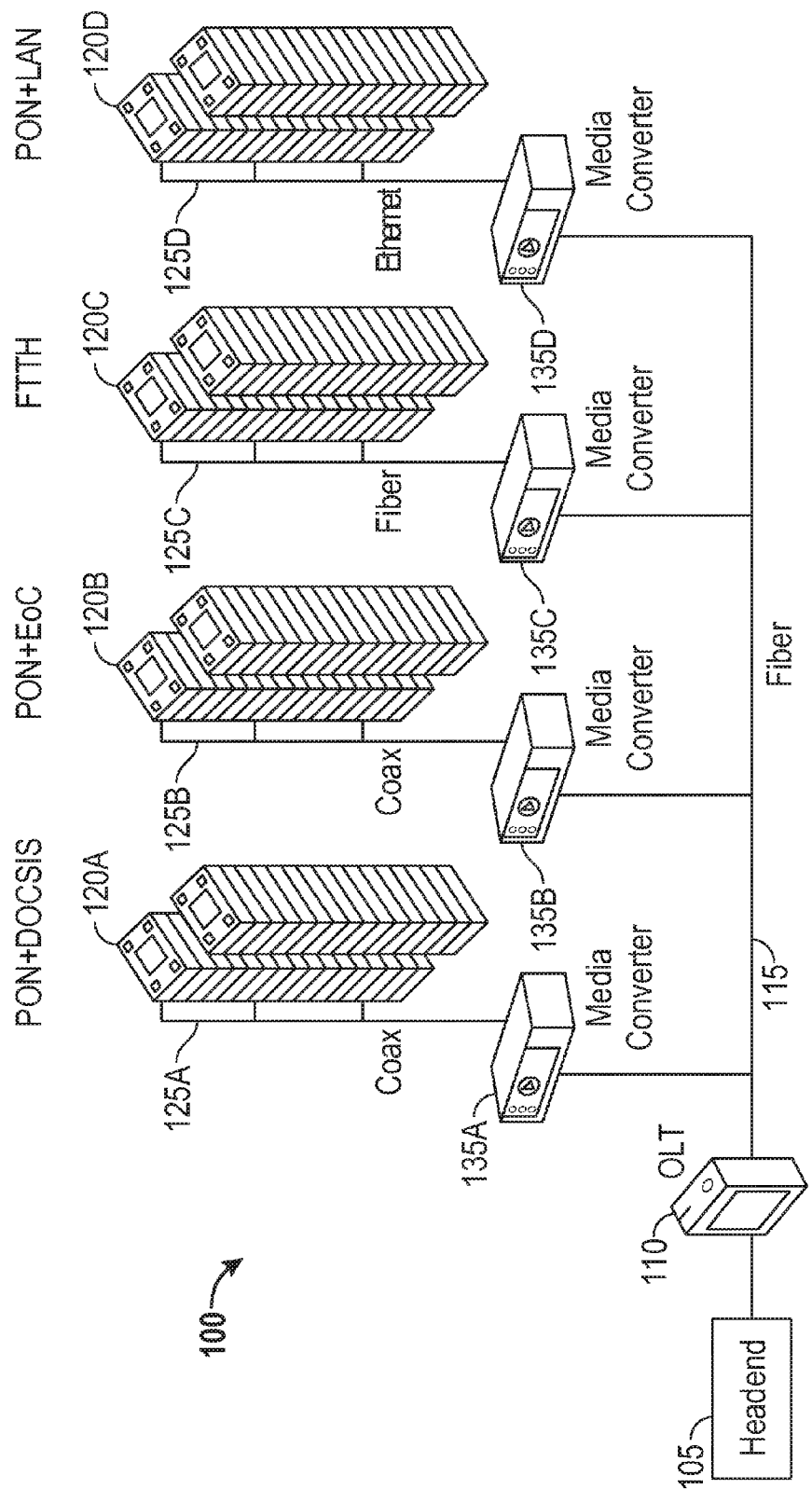
FIG. 1 illustrates an example network environment in which a content distribution system may be implemented in accordance with one or more implementations.

FIG. 1 illustrates an example network environment 100 in which a content distribution system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a headend 105, an optical line terminal (OLT) 110, buildings 120A-D, media converters 135A-D, a first transmission network 115, and second transmission networks 125A-D. The buildings 120A-D may be multi-dwelling units (MDUs), houses, offices, or any general structures. In one or more implementations, one or more of the buildings 120A-D may represent a collection of separate structures, such as a subdivision of separate houses.

The buildings 120A-D may include multiple gateway devices that are located in different units of the buildings 120A-D, such as different offices, different dwelling units, etc. The gateway devices may be coupled to the media converters 135A-D via the second transmission networks 125A-D and may be coupled to one or more user devices within the different units via local area networks. The second transmission networks 125A-D may include network couplings and/or adapters, such as splitters, and may include any network medium, such as coaxial transmission lines, fiber optic transmission lines, Ethernet transmission lines, power transmission lines, etc. In one or more implementations, the second transmission networks 125A-D may include a non-optical network medium, such as coaxial transmission lines.

In the network environment 100, the second transmission network 125A is represented as a Data Over Cable Service Interface Specification (DOCSIS) network that includes coaxial transmission lines, the second transmission network 125B is represented as a Ethernet over Coxial (EoC) network that includes coaxial transmission lines, the second transmission network 125C is represented as part of a fiber to the home (FTTH) network that includes fiber optic transmission lines, and the second transmission network 125D is represented as a local area network (LAN) that includes Ethernet transmission lines.

The media converters 135A-D may be coupled to the gateway devices via the second transmission networks 125A-D and may be coupled to the OLT 110 via the first transmission network 115. The first transmission network 115 may include one or more network couplings, or adapters, such as splitters, and may include any network medium, such as coaxial transmission lines, fiber optic transmission lines, Ethernet transmission lines, power transmission lines, etc. In one or more implementations, the first transmission network 115 may include an optical network medium and one or more optical splitters. In one or more implementations, the second network medium may be different than the first network medium. In the network environment 100, the first transmission network 115 is represented as a passive optical network (PON) that includes fiber optic transmission lines.

Since the media converters 135A-D are coupled to the gateway devices via the second transmission networks 125A-D, and to the OLT 110 via the first transmission network 115, the media converters 135A-D may convert signals received over the first transmission network 115, such as optical signals, to signals that can be transmitted over the second transmission networks 125A-D, such as electric signals. In one or more implementations, the media converters 135A-D may act as layer-2 bridges, which receive data packets from the OLT 110 of the headend 105 over optical network medium of the first transmission network 115, and bridge the received data packets over the non-optical network medium of the second transmission networks 125A-D to the gateways, and vice-versa.

The headend 105 may include one or more devices, such as network devices, transmitters, receivers, servers, etc., that are part of a content delivery network (CDN) that coordinates the delivery of content items, such as television programs, movies, songs or other audio programs, educational materials, community information, or generally any content items, to the user devices of the buildings 120A-D. The content items may be delivered to the user devices via any content delivery mechanism, such as adaptive bit rate (ABR) streaming. The headend 105 may use the OLT 110 to communicate over the first transmission network 115 with the media converters 135A-D.

The media converters 135A-D and the gateway devices may each include local caches, such as hard drives or other memory devices, for storing content items received from the headend 105 that are intended for distribution to the user devices. For example, the headend 105 may transmit content items that are expected to be requested by the user devices, such as popular movies, television shows, etc., to the media converters 135A-D and/or the gateway devices during off-peak hours. For example, if the headend 105 determines that there is a popular television series for which a not-yet-aired episode is expected to be requested by many of the user devices when the episode airs (or otherwise becomes available), the headend 105 may transmit the not-yet-aired episode to one or more of the media converters 135A-D and/or one or more of the gateways during off-peak hours, such as the night before the episode is scheduled to air (or otherwise become available). In this manner, the simultaneous viewing of the episode by many of the user devices the next day will not overwhelm the first transmission network 115 and/or the second transmission networks 125A-D. Similarly, if a user device is accessing an episode television series on-demand, the headend 105 can coordinate caching one or more subsequent episodes to a media converter 135A and/or a gateway device that is upstream from the user device.

In one or more implementations, the headend 105 may receive an indication from a third party server, such as a content provider server, that a particular content item is expected to be requested by multiple user devices. For example, the headend 105 may receive an indication from an audio content provider that an upcoming release of a song and/or album of a certain artist or style is expected to be requested by many of the user devices. The headend 105 may then transmit the song and/or album to the media converters 135A-D and/or the gateway devices in advance of the release date, such as the night before, e.g. an during off-peak, or low traffic, time period.

In one or more implementations, the media converters 135A-D and/or the gateway devices may autonomously determine one or more content items that are expected to be requested by the user devices, e.g. by monitoring viewing habits, viewing preferences, etc. of the downstream user devices. The media converters 135A-D and/or the gateway devices may request that the headend 105 transmit the one or more content items to the media converters 135A-D and/or the gateway devices in advance of when the content items are expected to be requested by the user devices, such as during off-peak hours.

In one or more implementations, the headend 105 and/or the media converters 135A-D may determine content items that are expected to be requested by the user devices based at least in part on content access histories of the user devices, content items that are accessible to the user devices, e.g. based on subscriptions and/or service tiers associated with the user devices, etc. The headend 105 may coordinate the distribution and caching of content at the media converters 135A-D and the media converters 135A-D may coordinate the distribution and the caching of content at the gateway devices. The headend 105 and/or media converters 135A-D may dynamically rebalance the distribution of cached content items based on cache space availability and channel bandwidth availability.

The media converters 135A-D and the gateway devices may be configured to intercept requests from the user devices for content items, or portions of content items, that are locally cached at the media converters 135A-D or the gateway devices. The media converters 135A-D and/or the gateway devices may then provide the requested content item, or requested portion of the content item, to the user devices, thereby reducing upstream traffic in the network environment 100. In one or more implementations, the media converters 135A-D may intercept a request for a content item and may redirect the requests to a cached copy of the requested content item. An example media converter 135B is discussed below with respect to FIG. 4, and an example process of a media converter 135B is discussed below with respect to FIG. 7. An example gateway device is discussed below with respect to FIG. 5, and an example process of a gateway device is discussed below with respect to FIG. 8. In one or more implementations, one or more of the media converters 135A-D and/or one or more of the gateway devices may be, or may include one or more components of, the electronic system that is discussed below with respect to FIG. 9.

Figure 2:
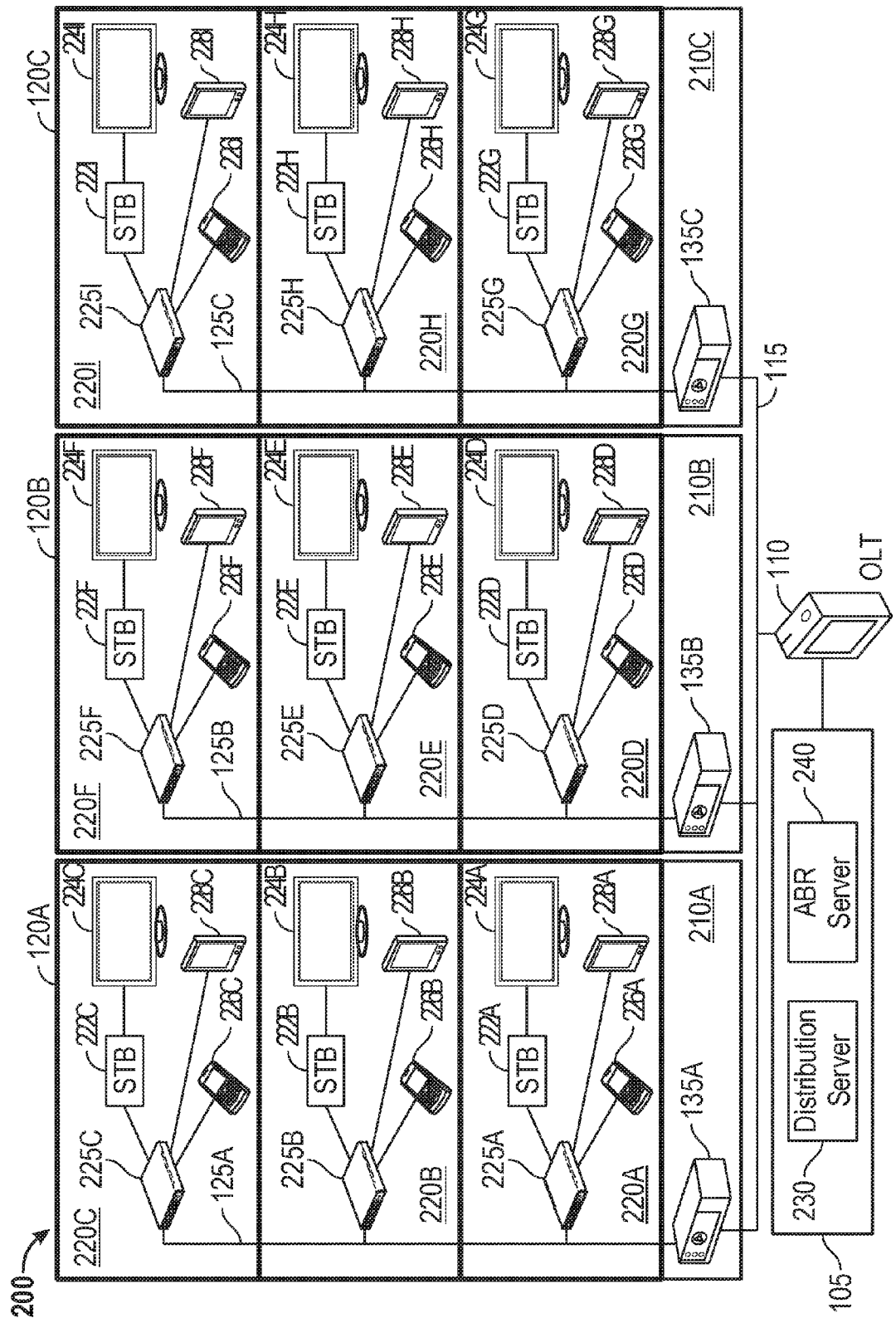
FIG. 2 illustrates an example network environment in which a content distribution system may be implemented in accordance with one or more implementations.

FIG. 2 illustrates an example network environment 200 in which a content distribution system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 200 includes the headend 105, the OLT 110, the buildings 120A-C, the first transmission network 115 and the second transmission networks 125A-C. The buildings 120A-C include utility areas 210A-C and units 220A-I. The headend 105 may include a distribution server 230 and an adaptive bit rate (ABR) server 240. The units 220A-I may include gateway devices 225A-I, electronic devices 222A-I, 226A-I, 228A-I, and display devices 224A-I.

The utility areas 210A-C may be common areas of the buildings 120A-C, e.g. areas of the buildings 120A-C that are accessible to utility operators, such as broadband service providers. In one or more implementations, the utility areas 210A-C may be in the basement of the buildings 120A-C or external to the buildings 120A-C. The units 220A-I of the buildings 120A-C may be dwelling units, office spaces, or generally any delineated structures within the buildings 120A-C. In one or more implementations, one or more of the buildings 120A-C may represent a collection of physically separate units 220A-I, such as a subdivision of separate houses.

The gateway devices 225A-I may include a network processor or a network device, such as a switch or a router, that is configured to couple the electronic devices 222A-I, 226A-I, 228A-I to the headend 105 via the media converters 135A-C. The gateway devices 225A-I may include local area network interfaces, such as wired interfaces and/or wireless access points, for communicating with the electronic devices 222A-I, 226A-I, 228A-I. The gateway devices 225A-I may include a local cache for caching content items and/or portions of content items, and the gateway devices 225A-I may include distribution control modules for coordinating the caching of the content items.

The electronic devices 222A-I, 226A-I, 228A-I can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for adaptive bit rate streaming, and rendering, of multimedia content and/or can be coupled to such a device. In the example of FIG. 2, the electronic devices 222A-I are depicted as set-top boxes (STBs) that are coupled to display devices 224A-I, such as televisions, the electronic devices 226A-I are depicted as smart phones, and the electronic devices 226A-I are depicted as tablet devices. In one or more implementations, any of the electronic devices 222A-I, 226A-I, 228A-I may be referred to as a user device and any of the electronic devices 222A-I, 226A-I, 228A-I may be, or may include one or more components of, the electronic system that is discussed below with respect to FIG. 9.

As shown in FIG. 2, the headend 105, media converters 135A-C, gateway devices 225A-I, and electronic devices 222A-I, 226A-I, 228A-I are arranged in a hierarchical tree network arrangement such that the headend 105 is directly coupled to the media converters 135A-C, the media converter 135A is directly coupled to the gateway devices 225A-C, the media converter 135B is directly coupled to the gateway devices 225D-F, the media converter 135C is directly coupled to the gateway devices 225G-I, the gateway device 225A is directly coupled to the electronic devices 222A, 226A, 228A, the gateway device 225B is directly coupled to the electronic devices 222B, 226B, 228B, etc. In other words, the headend 105 is located directly upstream from the media converters 135A-C, the media converter 135A is located directly upstream from the gateway devices 225A-C, the media converter 135B is located directly upstream from the gateway devices 225D-F, the media converter 135C is located directly upstream from the gateway devices 225G-I, the gateway device 225A is located directly upstream from the electronic devices 222A, 226A, 228A, the gateway device 225B is located directly upstream from the electronic devices 222B, 226B, 228B, etc.

The media converters 135A-C and/or the gateway devices 225A-I, may each include a cache, such as a hard drive or other memory device, that stores content items, and/or portions thereof, intended for distribution from the headend 105 to one or more of the electronic devices 222A-I, 226A-I, 228A-I. Thus, the caching of the content items is distributed across two layers of network nodes in the hierarchical network arrangement, first the media converters 135A-C and then the gateway devices 225A-I. If a content item that is cached by a media converter 135A or a gateway device 225A is requested by an electronic device 222A, the content item is provided to the electronic device 222A by the media converter 135A or the gateway device, rather than by the headend 105, thereby conserving upstream bandwidth.

The distribution server 230 and/or the ABR server 240 of the headend 105 may each be a single computing device such as a computer server. In another example, distribution server 230 and/or the ABR server 240 may each represent one or more computing devices (such as a cloud of computers and/or a distributed system) that are communicatively coupled, such as communicatively coupled over a network, and that collectively, or individually, perform one or more functions that can be performed server-side, such as transcoding a content item into multiple encoded streams based on multiple bit rates, segmenting the encoded streams, transmitting the segmented encoded streams, and/or generally any functions that can be performed server-side. The distribution server 230 and/or the ABR server 240 may be coupled with various databases, storage services, or other computing devices. In one or more implementations, the distribution server 230 and/or the ABR server 240 may be, or may include one or more components of, the electronic system that is discussed below with respect to FIG. 9.

The ABR server 240 may receive content items for transmission to receiving devices, e.g. via the content delivery network of the headend 105. The content items may include multimedia content items, such as video, television programs, movies, web pages or generally any content items. The ABR server 240 may determine different ABR profiles for encoding the content items, e.g. based on determinable network conditions, channel capabilities, device capabilities, etc. The ABR server 240 may transcode the content items into different encoded streams based at least in part on the ABR profiles. The ABR profiles may indicate one or more encoding characteristics or parameters for encoding the content item, such as bit rate, codec, resolution, frame rate, or generally any encoding characteristics. The ABR server 240 may segment the encoded streams into sequential segments of a given duration (e.g. 2-10 seconds) to generate ABR segments. It is understood that segments of any duration may be selected.

The ABR server 240 may transmit a manifest file, e.g. to the electronic devices 222A-I, 226A-I, 228A-I that identifies the segments of the content item, the different bit rates at which each segment has been encoded, and a network identifier for accessing each segment, e.g. a uniform resource locator (URL), or contain other identifying information about the ABR segments. The electronic devices 222A-I, 226A-I, 228A-I may then retrieve individual ABR segments that are identified in the manifest file, e.g. by requesting the URLs associated with the individual segments.

The distribution server 230 may coordinate caching of content items, and/or portions thereof, e.g. ABR segments, in the media converters 135A-C. The distribution server 230 may communicate with distribution control modules of the media converters 135A-C to coordinate caching the content items at the media converters 135A-C. The distribution control modules of the media converters 135A-C may also coordinate the caching of content in the subset of the downstream gateway devices 225A-I that are directly coupled to the media converters 135A-C. For example, the media converter 135A may coordinate the caching of content in the gateway devices 225A-C. The distribution control modules of the media converters 135A-C may communicate with distribution control modules of the gateway devices 225A-I to coordinate caching content items at the gateway devices 225A-I. The distribution server 230 of the headend 105 and the distribution control modules of the media converters 135A-C and the gateway devices 225A-I are discussed further below with respect to FIG. 3.

The distribution server 230 of the headend 105 and/or the distribution control modules of the media converters 135A-C may control the distribution of the caching such that content items, or portions thereof, that are expected to be requested by one or more of the electronic devices 222A-I, 226A-I, 228A-I are cached at the media converters 135A-C and/or the gateway devices 225A-I that service, e.g. are directly upstream from, the electronic devices 222A-I, 226A-I, 228A-I, prior to the content items, or portions thereof, being requested by the electronic devices 222A-I, 226A-I, 228A-I. For example, when an electronic device 222A requests a content item, or a portion thereof, from the headend 105 that is cached at the gateway device 225A, or the media converter 135A, that services the electronic device 222A, the gateway device 225A or media converter 135A can intercept the request, e.g. since the request will be transmitted to the headend 105 via the gateway device 225A and the media converter 135A, and the gateway device 225A or the media converter 135A can provide the cached content item, or portion thereof, to the electronic device 222A, instead of transmitting the request back to the headend 105. In this manner requested content items can be provided to the electronic devices 222A-I, 226A-I, 228A-I from a proximal network node, thereby reducing upstream congestion.

In one more implementations, the distribution server 230 of the headend 105, and/or the distribution control modules of the media converters 135A-C and/or the gateway devices 225A-I may collectively maintain a cache directory of cached content items. The cache directory may be locally stored at the distribution server 230 of the headend 105, and/or at the distribution control modules of one or more of the media converters 135A-C and/or the gateway devices 225A-I. The cache directory may include, for example, an identification of each cached content item, or portion thereof, and a network identifier, such as a uniform resource locator (URL), for accessing the content item, or portion thereof. The gateway devices 225A-I and/or the media converters 135A-C may utilize content redirection techniques, such as hypertext transport protocol (HTTP) redirection techniques, to allow the electronic devices 222A-I, 226A-I, 228A-I to access content items that are cached at the media converters 135A-C and/or at the gateway devices 225A-I that are not directly upstream from the electronic devices 222A-I, 226A-I, 228A-I.

For example, a gateway device 225D and/or a media converter 135B that are located directly upstream from an electronic device 222D may intercept a request for a content item, or portion thereof, from the electronic device 222D. If the requested content item is not cached at the gateway device 225D or the media converter 135B, the gateway device 225D and/or the media converter 135B may determine, based on the locally stored cache directory, whether the requested content item is cached at another media converter 135A,C or gateway device 225A-C, E-I. If the requested content item is cached at another media converter 135A,C or gateway device 225A-C, E-I, the gateway device 225D and/or the media converter 135B may utilize an HTTP redirection technique to redirect the request of the electronic device 222D from the headend 105, e.g. the ABR server 240 of the headend 105, to the another media converter 135A,C or gateway device 225A-C, E-I, such as the media converter 135A.

The distribution server 230 of the headend 105 may partition the electronic devices 222A-I, 226A-I, 228A-I into groups based on the content items that are expected to be requested by the electronic devices 222A-I, 226A-I, 228A-I. For example, the electronic devices 222A-I, 226A-I, 228A-I may be partitioned into groups based on characteristics associated with the electronic devices 222A-I, 226A-I, 228A-I and/or characteristics associated with the users interacting with the electronic devices 222A-I, 226A-I, 228A-I, such as the level of service, e.g. channel tier, accessible to the electronic devices 222A-I, 226A-I, 228A-I, e.g. via subscriptions, the physical locations of the electronic devices 222A-I, 226A-I, 228A-I, the demographics of the users interacting with the electronic devices 222A-I, 226A-I, 228A-I, content items previously accessed by the electronic devices 222A-I, 226A-I, 228A-I, such as episodes of a serial television program, or generally any characteristics that are indicative of content items that may be requested in the future by the electronic devices 222A-I, 226A-I, 228A-I.

For a given group of the electronic devices 222A-I, 226A-I, 228A-I, such as the group of the electronic devices 222A-I, 226D-F, 228D-F that can access a particular channel tier, the distribution server 230 of the headend 105 may determine one of the media converters 135A-C that provides service to, e.g. is directly upstream from, the largest number of the electronic devices 222A-I, 226D-F, 228D-F in the group. Since the media converter 135B provides service to nine out of fifteen of the electronic devices 222A-I, 226D-F, 228D-F in the group, e.g. the electronic devices 222D-F, 226

D-F, 228D-F, the distribution server 230 of the headend 105 may determine the media converter 135B. The distribution server 230 of the headend 105 may then determine the most popular content items for the group, e.g. the content items that are expected to be requested most often, or the most number of times, by the electronic devices 222A-I, 226D-F, 228D-F in the group, such as based on content access patterns of the electronic devices 222A-I, 226D-F, 228D-F. The distribution server 230 coordinates distributing the most popular content items to the determined media converter 135B, e.g. based on cache space and bandwidth availability of the media converter 135B, by communicating with the distribution control module of the media converter 135B.

The distribution server 230 of the headend 105 may determine less popular content items for the electronic devices 222A-I, 226D-F, 228D-F in the group, e.g. the content items that are expected to be requested less frequently by the electronic devices 222A-I, 226D-F, 228D-F in the group. The distribution server 230 coordinates distributing the less popular content items for caching at the other media converters 135A,C. The distribution controllers of the media converters 135A-C may subsequently rebalance the distribution of the cached content items based at least in part on cache space availability and channel bandwidth availability, e.g. upstream bandwidth, of the media converters 135A-C.

Once the media converters 135A-C receive content items, and/or portions thereof, to be cached from the headend 105, the distribution control modules of the media converters 135A-C may identify content items that can be cached downstream at one or more of the gateway devices 225A-I, such as content items that are only expected to be accessed by a single electronic device 222A. The media converters 135A-C may determine that a particular content item is only expected to be accessed by a single electronic device 222A based at least in part on content access patterns of the electronic devices 222A-I, 226D-F, 228D-F in the group. In one or more implementations, the content access patterns of the electronic devices 222A-I, 226D-F, 228D-F in the group may be determined by one or more of the media converters 135A-C and/or the gateway devices 225A-I, by sniffing the network protocol messages, such as ABR requests, that pass through the media converters 135A-C and/or gateway devices 225A-I. The distribution control modules of the media converters 135A-C may coordinate moving these content items from the cache of the media converters 135A-C to the cache of one or more of the gateway devices 225A-I. The distribution controllers of the media converters 135A-C may then coordinate with the distribution server of the headend 105 to receive additional content items, or portions thereof, to cache, e.g. in the cache space vacated by pushing the content item down to the one or more gateway devices 225A-I.

For example, a media converter 135B may determine that a content item can be cached at one of the gateway devices 225A-I, such as the gateway device 225D, when the content item is expected to be primarily accessed by the electronic devices 222D, 226D, 228D that are directly downstream from the gateway device 225D. In one or more implementations, a content item may be cached at a gateway device 225D if the content item is expected to be primarily accessed by the electronic devices 222D, 226D, 228D that are directly downstream from the gateway device 225D, and/or by the electronic devices 222E-F, 224E-F, 228E-F that are directly downstream from the gateway devices 225E-F that are directly coupled to the gateway device 225D, e.g. via the second transmission network 125B.

In one or more implementations, distribution control modules of the gateway devices 225A-I may communicate directly with the distribution server 230 of the headend 105, e.g. via a distribution control module of one of the media converters 135A-C, in order to coordinate caching content items on the gateway device that are expected to be accessed by electronic devices 222A-I, 226A-I, 228A-I that are served by the gateway device, such as based on content access patterns of the electronic devices 222A-I, 226A-I, 228A-I. For example, if a gateway device 225A includes, or is coupled to, a set-top box that is configured to record a television show on a weekly basis, the gateway device 225A may coordinate with the distribution server 230 of the headend 105 in order to have the television program cached on the gateway device 225A prior to its air time, e.g. during off-peak hours. Similarly, if an electronic device 222A is accessing an episode of a television series on-demand via a gateway device 225A, the gateway device 225A may coordinate with the distribution server 230 of the headend 105 to cache subsequent episodes of the television series, e.g. during off-peak hours. In one or more implementations, the gateway device 225A may determine the content access patterns of the electronic devices 222A, 226A, 228A served by the gateway device 225A by sniffing the network protocol messages, such as ABR requests, that pass through the gateway device 225A.

Figure 3:
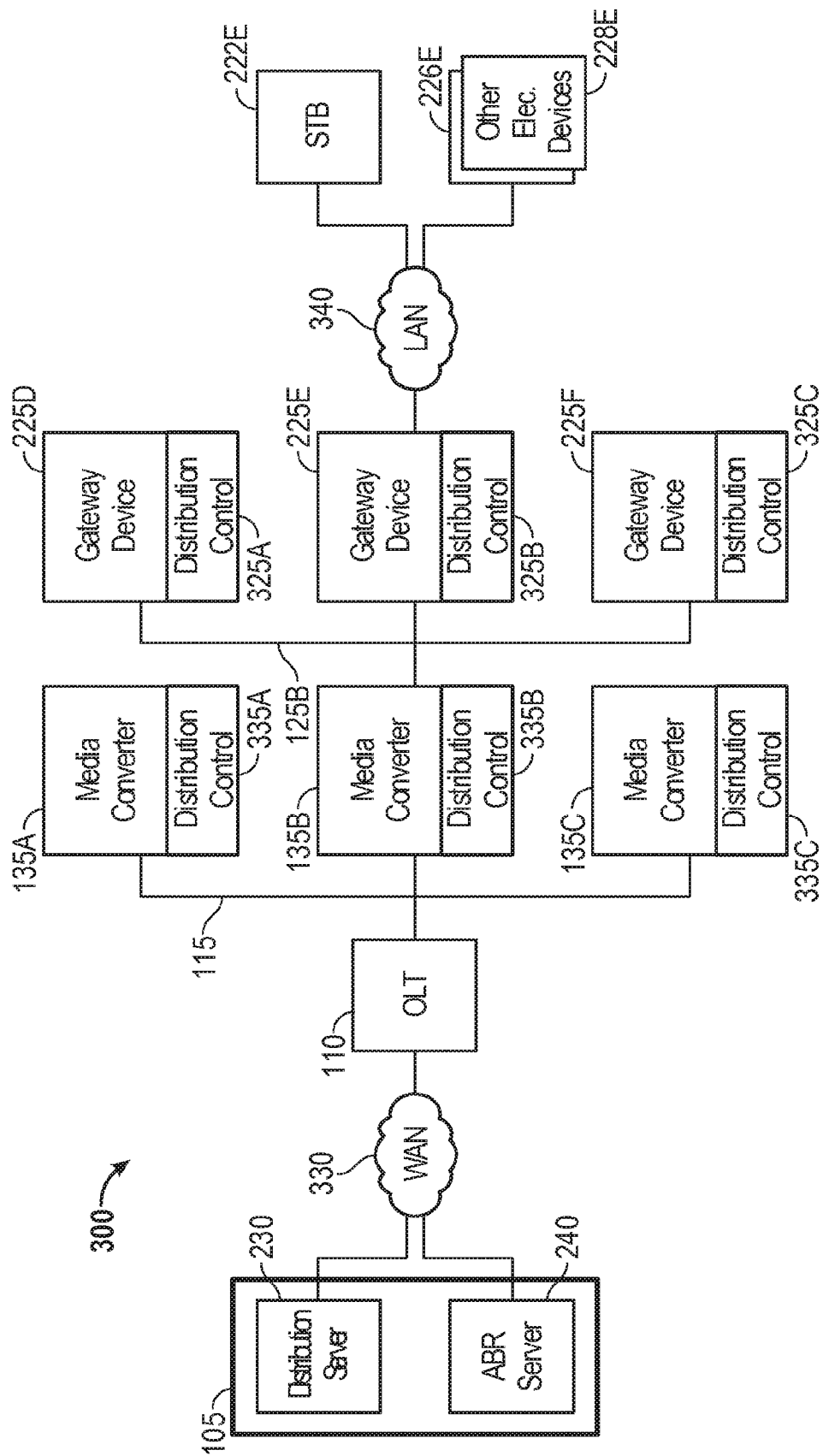
FIG. 3 illustrates an example network environment in which a content distribution system may be implemented in accordance with one or more implementations.

FIG. 3 illustrates an example network environment 300 in which a content distribution system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 300 includes the headend 105, a wide area network (WAN) 330, the OLT 110, the first transmission network 115, the second transmission network 125B, the media converters 135A-C, the gateway devices 225D-F, the local area network (LAN) 340, the electronic device 222E, and the other electronic devices 226E, 228E. The headend 105 includes a distribution server 230 and an adaptive bit rate (ABR) server 240. The media converters 135A-C each includes the distribution control modules 335A-C, and the gateway devices 225D-F each include the distribution control modules 325A-C. The distribution control modules 325A-C, 335A-C may each include a cache, a distribution client, and a distribution controller, as is discussed further below with respect to FIGS. 4 and 5. The WAN 330 may be a public communication network (such as the Internet, cellular data network, dialup modems over a telephone network). The LAN 340 may be a private communications network (such as private LAN, leased lines, etc.).

In operation, the distribution server 230 may coordinate the caching of content items, and/or portions thereof, such as segments of content items provided by the ABR server 240, at the media converters 135A-C by communicating with the distribution control modules 335A-C of the media converters. The distribution control module 335B of the media converter 135B may coordinate caching of the content items, and/or portions thereof, at the gateway devices 225D-F by communicating with the distribution control modules 325A-C of the gateway devices 225D-F. The distribution server 230 and the distribution control modules 325A-C, 335A-C may collectively maintain a cache directory that includes, e.g. an identifier of each cached content item and a network identifier, such as a URL, for accessing the cached content item. In one or more implementations, the cache directory may be centrally maintained at a single network node, such as by the distribution server 230 and/or one of the distribution control modules 325A-C, 335A-C, where any changes to the cache directory are communicated to the central network node and then pushed out to the distribution server 230 and/or the other distribution control modules 325A-C, 335A-C.

The distribution server 230 and/or the distribution control modules 325A-C, 335A-C, may periodically rebalance the distribution of the cached content items, or may rebalance the distribution of the cached content items upon determining that the distribution of the cached content items is unbalanced. For example, the distribution of the content items may be rebalanced based at least in part on cache space availability and channel bandwidth availability, such as upstream and/or downstream channel bandwidth availability. For example, if a content item that is cached at the media converter 135A is being requested, or is expected to be requested, by the electronic devices 222E, 226E, 228E, more often than the electronic devices 222A-C, 226A-C, 228A-C that are downstream from the media converter 135A, then it may be a more efficient utilization of upstream bandwidth to move the content item to the cache of the media converter 135B, if cache space is available.

Figure 4:
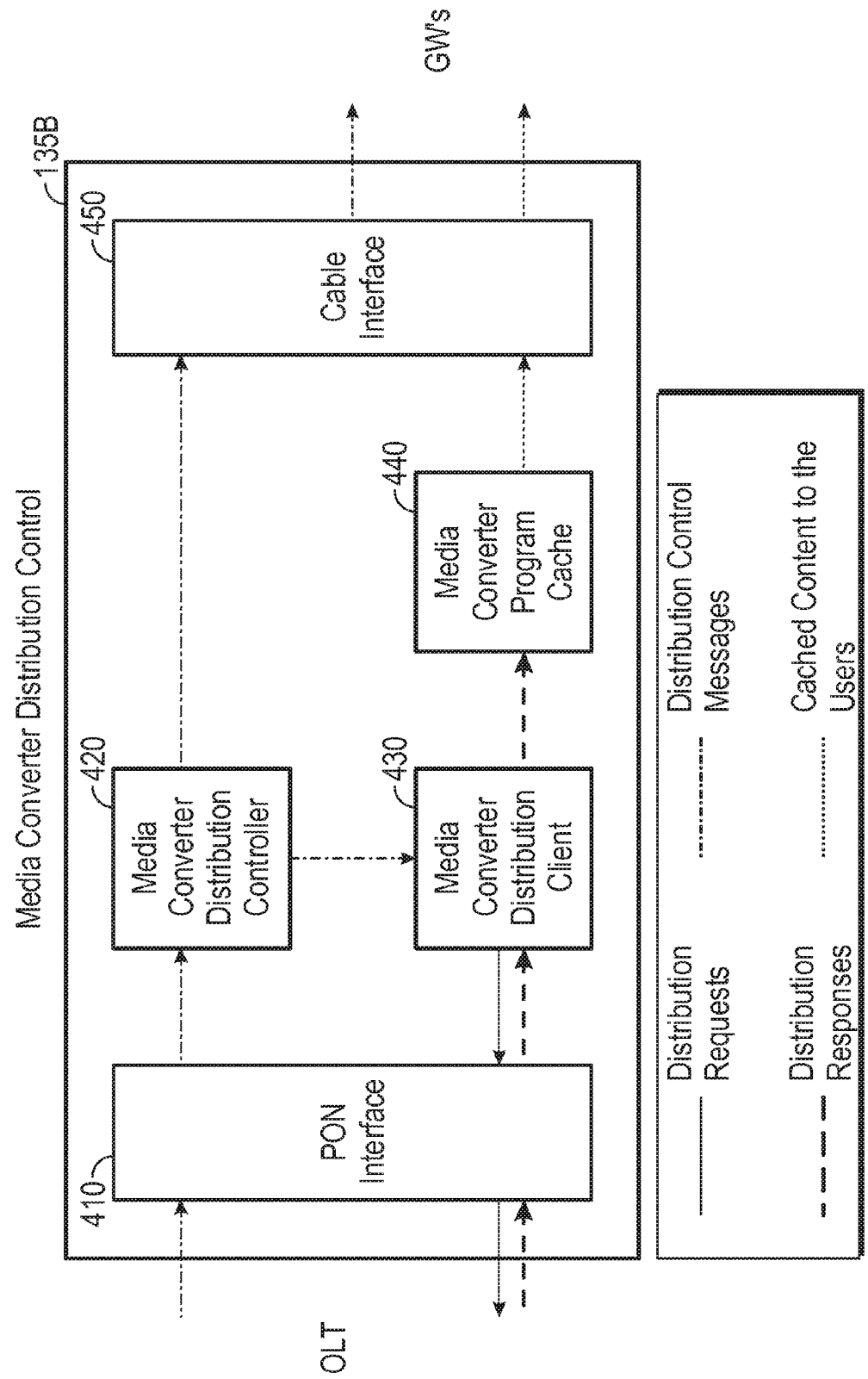
FIG. 4 illustrates an example media converter that may be used in a content distribution system in accordance with one or more implementations.

FIG. 4 illustrates an example media converter 135B that may be used in a content distribution system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The media converter 135B may include a passive optical network (PON) interface 410, a media converter distribution controller 420, a media converter distribution client 430, a media converter program cache 440, and a cable interface 450. The PON interface 410 may communicatively couple the media converter 135B to the OLT 110 via the first transmission network 115 and the cable interface 450 may communicatively couple the media converter 135B to the gateway devices 225D-F via the second transmission network 125B. The media converter distribution controller 420, the media converter distribution client 430, and/or the media converter program cache 440, may collectively form the distribution control module 335B of the media converter 135B.

In operation, the media converter distribution controller 420 implements distribution algorithms and schedules the distribution of the content items, e.g. from the distribution server 230 and/or to one or more of the gateway devices 225D-F, such as during off-peak hours. For example, the media converter distribution controller 420 may receive distribution control messages from the distribution server 230 and the media converter distribution controller 420 may transmit distribution control messages to the gateway devices 225D-F. The actual distribution of the content items is performed by the media converter distribution client 430 via one or more distribution protocols, such as adaptive bit rate (ABR) streaming, trivial file transfer protocol (TFTP), file transfer protocol (FTP), or generally any distribution protocol. For example, the media converter distribution client 430 may transmit distribution requests, e.g. to the distribution server 230, and the media converter distribution client 430 may receive distribution responses, e.g. content items, from the distribution server 230. The cached content items are stored in the media converter program cache 440 and are provided to the electronic devices 222A-I, 226A-I, 228A-I, such as in response to intercepted requests therefor, and/or in response to redirected requests therefor, e.g. HTTP redirected requests.

Figure 5:
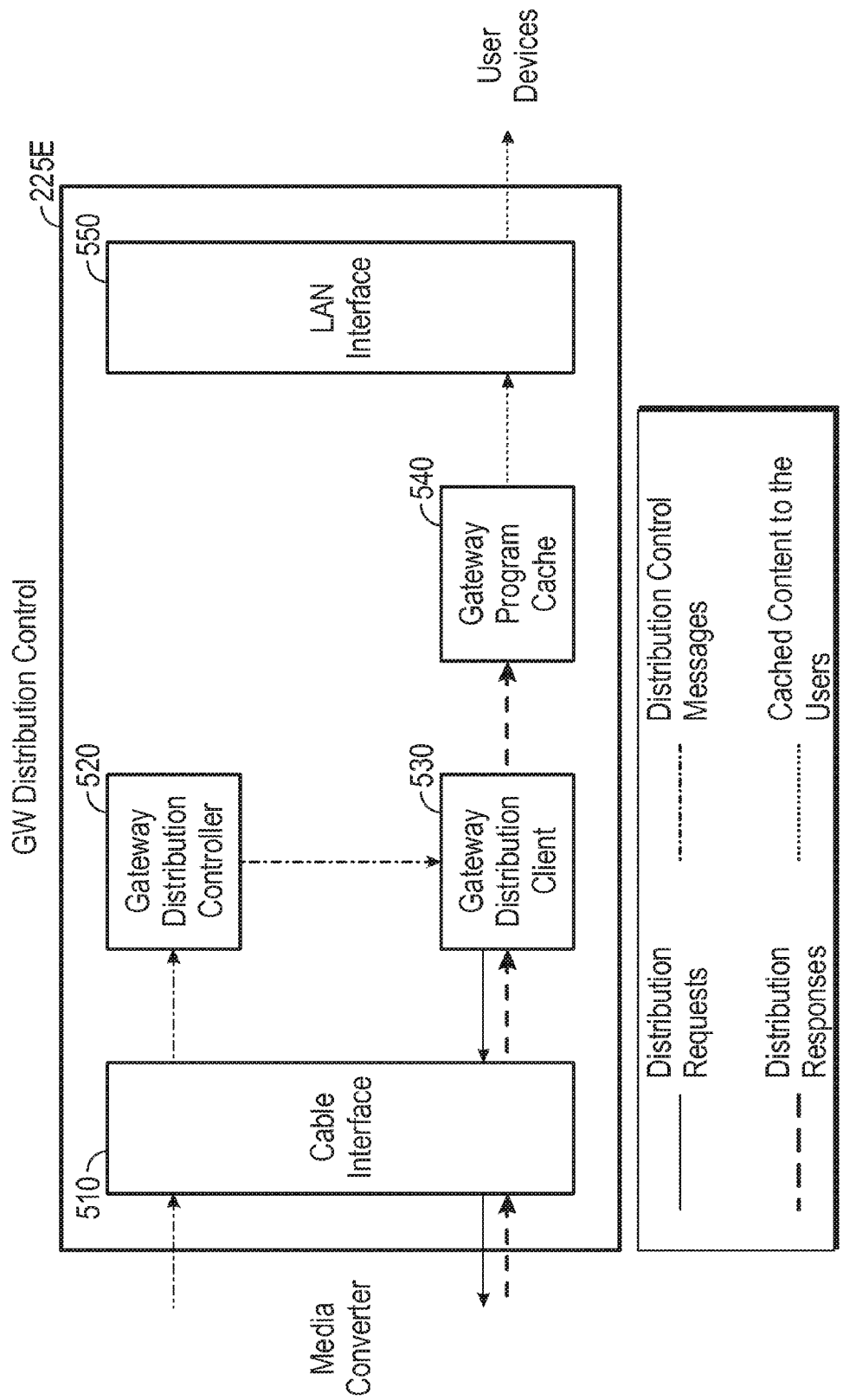
FIG. 5 illustrates an example gateway device that may be used in a content distribution system in accordance with one or more implementations.

FIG. 5 illustrates an example gateway device 225E that may be used in a content distribution system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The gateway device 225E includes a cable interface 510, a gateway distribution controller 520, a gateway distribution client 530, a gateway program cache 540, and a local area network (LAN) interface 550. The cable interface 510 may communicatively couple the gateway device 225E to the media converter 135B via the second transmission network 125B. The LAN interface 550 may communicatively couple the gateway device 225E to the electronic devices 222E, 226E, 228E via the LAN 340. The gateway distribution controller 520, the gateway distribution client 530, and/or the gateway program cache 540, may collectively form the distribution control module 325B of the gateway device 225E.

In operation, the gateway distribution controller 520 implements distribution algorithms and schedules the distribution of the content items, e.g. from the distribution server 230 and/or the media converter 135B, such as during off-peak hours. For example, the gateway distribution controller 520 may receive distribution control messages from the distribution server 230 and/or the media converter 135B. The actual distribution of the content items is performed by the gateway distribution client 530 via one or more distribution protocols, such as adaptive bit rate (ABR) streaming, trivial file transfer protocol (TFTP), file transfer protocol (FTP), or generally any distribution protocol. For example, the gateway distribution client 530 may transmit distribution requests, e.g. to the distribution server 230 and/or the media converter 135B, and the gateway distribution client 530 may receive distribution responses, e.g. content items, from the distribution server 230 and/or the media converter 135B. The cached content items are stored in the gateway program cache 540 and are provided to the electronic devices 222A-I, 226A-I, 228A-I, such as in response to intercepted requests therefor, and/or in response to redirected requests therefor, e.g. HTTP redirected requests.

Figure 6:
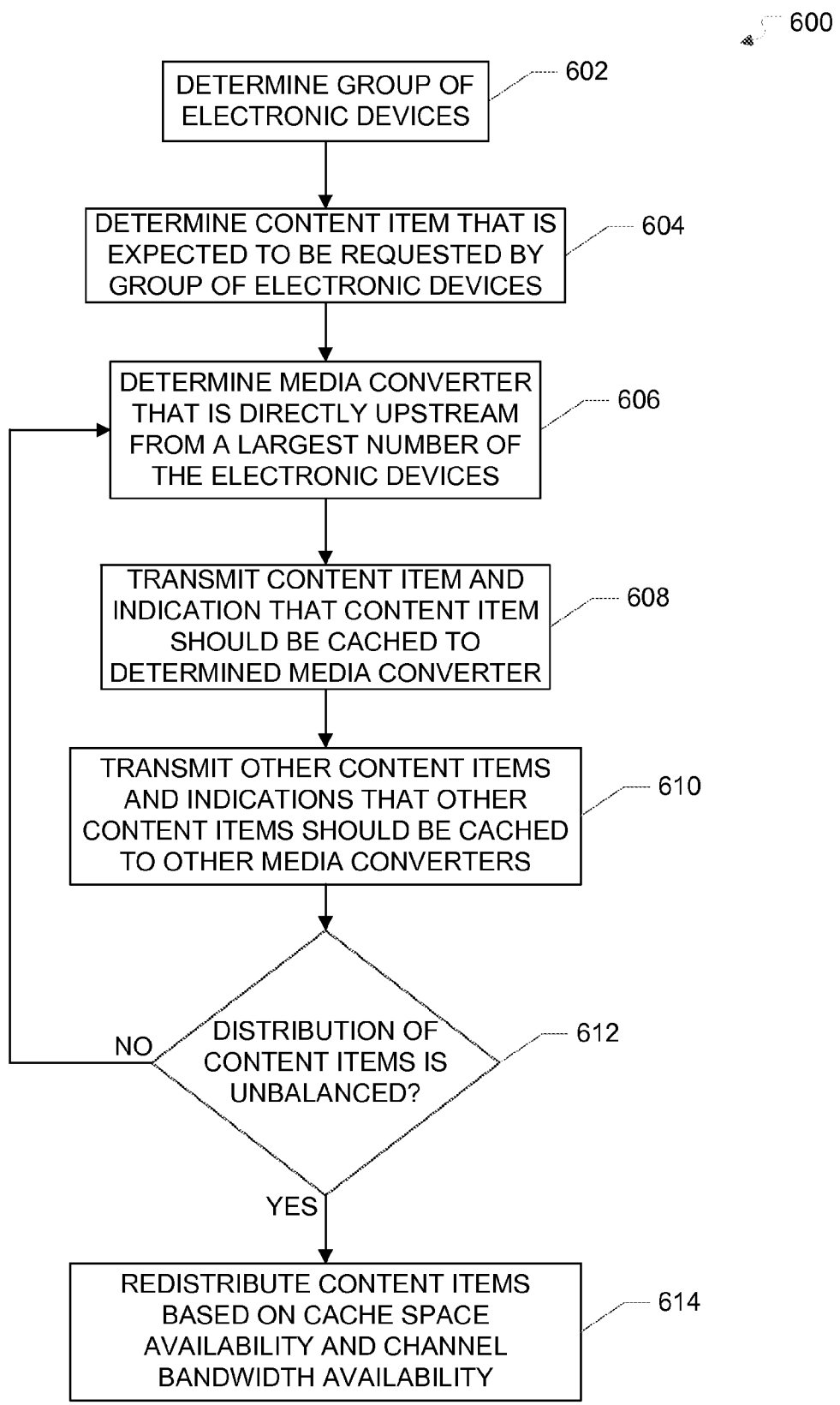
FIG. 6 illustrates a flow diagram of an example process of a distribution server in a content distribution system in accordance with one or more implementations.

FIG. 6 illustrates a flow diagram of an example process of a distribution server 230 of a headend 105 in a content distribution system in accordance with one or more implementations. For explanatory purposes, the example process 600 is described herein with reference to the distribution server 230 of the headend 105 of FIGS. 3 and 4; however, the example process 600 is not limited to the distribution server 230 of the headend 105 of FIGS. 3 and 4, and the example process 600 may be performed by one or more of the components of the distribution server 230. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The distribution server 230 determines a group of the electronic devices 222A-I, 226A-I, 228A-I (602), such as based on characteristics of the electronic devices 222A-I, 226A-I, 228A-I, and/or characteristics of users that are interacting with the electronics devices 222A-I, 226A-I, 228A-I. For example, the distribution server 230 may determine the group from the electronic devices 222A-I, 226D-F, 228D-F, that share a common characteristic, such as having access to common content items, e.g. through a service level or tier, common content access patterns, etc. The distribution server 230 determines a content item that is expected to be requested by a largest number of the electronic devices 222A-I, 226D-F, 228D-F of the determined group (604), e.g. the content item that is expected to be the most popular amongst the electronic devices 222A-I, 226D-F, 228D-F. For example, the distribution server 230 may analyze content access histories of the electronic devices 222A-I, 226D-F, 228D-F in the group to determine a content item that is expected to be requested by one or more of the electronic devices 222A-I, 226D-F, 228D-F in the group.

The distribution server 230 determines one of the media converters 135A-C that is directly upstream from the largest number of the electronic devices 222A-I, 226D-F, 228D-F in the group (606) or one of the media converters 135A-C that is directly upstream from the largest number of the electronic devices 222A-I, 226D-F, 228D-F in the group that are expected to request the content item. Since the media converter 135B is directly upstream from nine of the fifteen electronic devices 222A-I, 226D-F, 228D-F that are in the group, the distribution server 230 may determine the media converter 135B. The distribution server 230 transmits the content item and an indication that the content item should be cached to the determined media converter 135B (608). For example, the distribution server 230 may coordinate with the distribution control module 335B of the media converter 135B to transmit the content item to the media converter 135B. If the media converter 135B has cache space for additional content items, the distribution server 230 may transmit additional content items that are expected to be popular amongst the electronic devices 222A-I, 226D-F, 228D-F in the group to the media converter 135B.

The distribution server 230 may then transmit other content items that are expected to be requested by the electronic devices 222A-I, 226D-F, 228D-F to the other media converters 135A,C (610). For example, the distribution server 230 may transmit less popular content items, such as "long-tail" content items, to the media converters 135A,C. The distribution server 230 determines whether the distribution of the content items is unbalanced (612), e.g. based on cache space availability of the media converters 135A-C and/or channel bandwidth availability of the media converters 135A-C.

If the distribution server 230 determines that the distribution of content is unbalanced (612), the distribution server 230 coordinates the redistribution of the content items with the media converters 135A-C based on the cache space availability and channel bandwidth availability of the media converters 135A-C. In one or more implementations, the distribution server 230 may perform the redistribution (614) on a periodic basis, such as on an hourly basis, a daily basis, or any periodic basis. If the distribution server 230 determines that the distribution of the content is balanced (612), the distribution server 230 determines whether there are any additional content items that can be cached at the media converters 135A-C (604).

Figure 7:
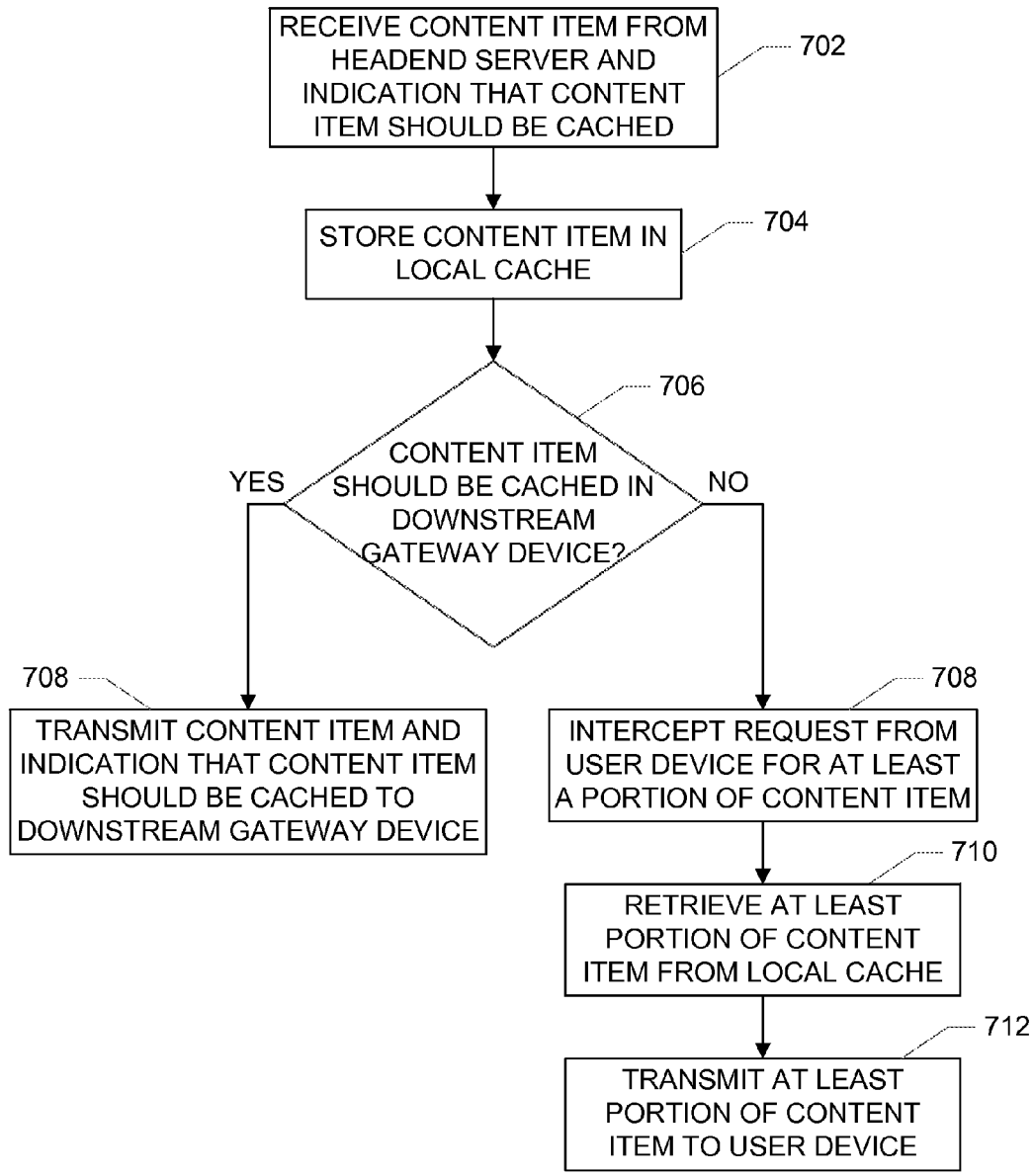
FIG. 7 illustrates a flow diagram of an example process of a media converter in a content distribution system in accordance with one or more implementations.

FIG. 7 illustrates a flow diagram of an example process 700 of a media converter 135B in a content distribution system in accordance with one or more implementations. For explanatory purposes, the example process 700 is described herein with reference to the media converter 135B of FIGS. 1-4; however, the example process 700 is not limited to the media converter 135B of FIGS. 1-4, and the example process 700 may be performed by one or more of the components of the media converter 135B. Further for explanatory purposes, the blocks of the example process 700 are described herein as occurring in serial, or linearly. However, multiple blocks of the example process 700 may occur in parallel. In addition, the blocks of the example process 700 need not be performed in the order shown.

The media converter 135B receives a content item from the distribution server 230 and an indication that the content item should be cached (702). The media converter 135B stores the content item in a local cache, e.g. in the media converter program cache 440 (704). The media converter 135B determines whether the content item should be cached at a downstream gateway device 225D-F (706), rather than at the media converter 135B. For example, the media converter 135B may determine whether the content item is expected to be requested primarily, or solely, by electronic devices 222E, 226E, 228E that are directly downstream from one of the gateway devices 225D-F, e.g. the gateway device 225E. If the media converter 135B determines that the content item should be cached in one of the gateway devices 225D-F, such as the gateway device 225E, the media converter 135B transmits the content item and an indication that the content item should be cached to the gateway device 225E (714).

If the media converter 135B determines that the content item should not be cached at one of the downstream gateway devices 225D-F (706), the media converter 135B intercepts requests from one or more of the downstream electronic devices 222D-F, 226D-F, 228D-F, such as the electronic device 222E, for at least a portion of the content item (708). The media converter 135B retrieves the at least the portion of the content item from the local cache (710), e.g. the media converter program cache 440, and transmits the at least the portion of the content item to the electronic device 222E (712). In one or more implementations, the media converter 135B may receive redirected requests for at least a portion of the content item from one or more user devices 222A-C,G-I, 226A-C,G-I, 228A-C,G-I that are not located directly downstream from the media converter 135B, and the media converter 135B may provide the at least the portion of the content item in response to the request therefor.

Figure 8:
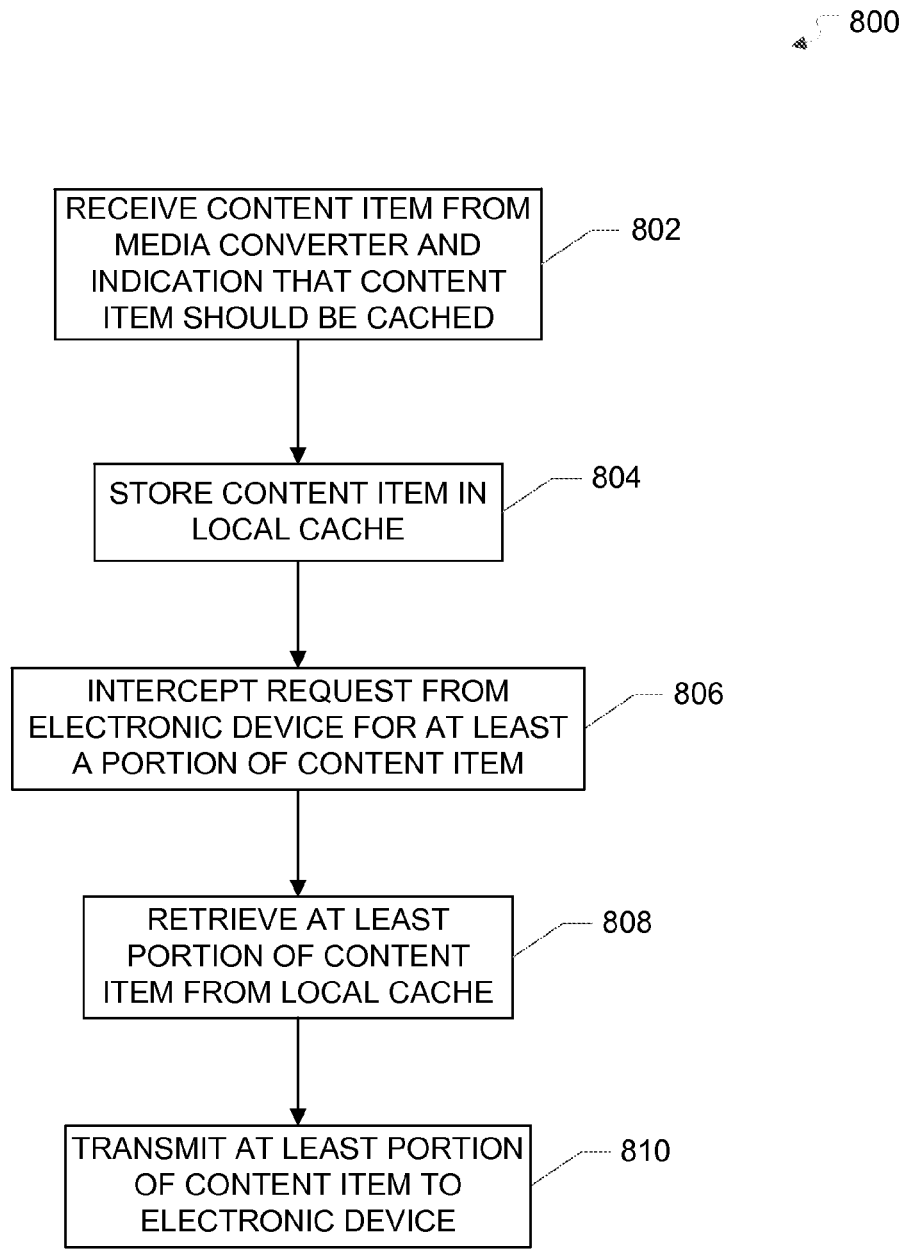
FIG. 8 illustrates a flow diagram of an example process of a gateway device in a content distribution system in accordance with one or more implementations.

FIG. 8 illustrates a flow diagram of an example process of a gateway device 225E in a content distribution system in accordance with one or more implementations. For explanatory purposes, the example process 800 is described herein with reference to the gateway device 225E of FIGS. 2, 3, and 5; however, the example process 800 is not limited to the gateway device 225E of FIGS. 2, 3, and 5, and the example process 800 may be performed by one or more of the components of the gateway device 225E. Further for explanatory purposes, the blocks of the example process 800 are described herein as occurring in serial, or linearly. However, multiple blocks of the example process 800 may occur in parallel. In addition, the blocks of the example process 800 need not be performed in the order shown.

The gateway device 225E receives a content item from the media converter 135B and an indication that the content item should be cached (802). The gateway device 225E stores the content item in a local cache, e.g. in the gateway program cache 540 (804). The gateway device 225E intercepts requests from one or more of the downstream electronic devices 222E, 226E, 228E, such as from the electronic device 222E, for at least a portion of the content item (806). The gateway device 225E retrieves the at least the portion of the content item from the local cache (808), e.g. the gateway program cache 540, and transmits the at least the portion of the content item to the electronic device 222E (810). In one or more implementations, the gateway device 225E may receive redirected requests for at least a portion of the content item from one or more of the user devices 222A-D,F-I, 226A-D,F-I, 228A-D,F-I that are not located directly downstream from the gateway device 225E, and the gateway device 225E may provide the at least the portion of the content item in response to the request therefor.

Figure 9:
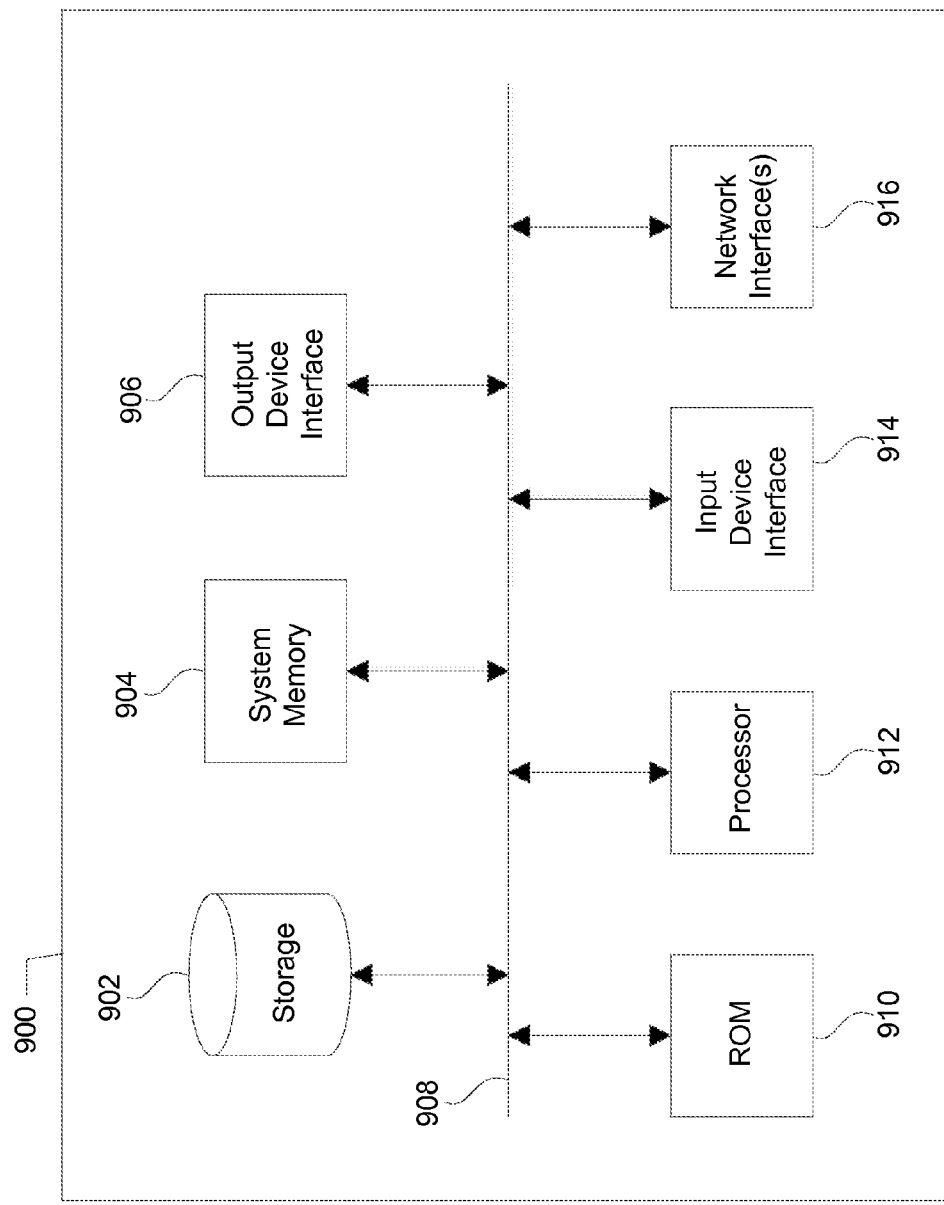
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a desktop computer, a laptop computer, a tablet computer, a server, a switch, a router, a base station, a receiver, a phone, a personal digital assistant (PDA), or generally any electronic device that transmits signals over a network. The electronic system 900 may be, and/or may include one or more components of, one or more of the media converters 135A-C, one or more of the gateway devices 225A-I, one or more of the electronic devices 222A-I, 226A-I, 228A-I, the distribution server 230, and/or the ABR server 240. Such an electronic system 900 includes various types of computer readable media and interfaces for various other types of computer readable media. The electronic system 900 includes a bus 908, one or more processing unit(s) 912, a system memory 904, a read-only memory (ROM) 910, a permanent storage device 902, an input device interface 914, an output device interface 906, one or more network interfaces 916, such as local area network (LAN) interfaces and/or wide area network interfaces (WAN), or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to a network (not shown) through one or more network interfaces 916, such as one or more LAN interfaces and/or WAN interfaces. In this manner, the electronic system 900 can be a part of a network of computers, such as a LAN, a WAN, an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A media converter device, comprising:
a first network interface configured to receive, from a headend server, a content item and a first indication that the content item should be cached, wherein the headend server is located upstream from the media converter device;
a cache configured to store the content item;
a distribution controller configured to determine, based at least in part on a number of a plurality of user devices that are expected to request the content item, that that the content item should be cached in one of a plurality of gateway devices that are located downstream from the media converter device, wherein the one of the plurality of gateway devices is communicatively coupled to the plurality of user devices; and
a second network interface configured to transmit, to the one of the plurality of gateway devices, the content item and a second indication that the content item should be cached at the one of the plurality of gateway devices, intercept a request for at least a portion of the content item, the request being received from another of the plurality of gateway devices, the request comprising an adaptive bit rate request for a segment of the content item, and the request being addressed to the headend server, and cause redirect the another of the plurality of gateway devices to retrieve the at least the portion of the content item from the one of the plurality of gateway devices in response to intercepting the request addressed to the headend server, intercept another request, transmitted by the one of the plurality of gateway devices and addressed to the headend server, for another at least a portion of another content item, the another at least the portion of the another content item being cached at the another of the plurality of gateway devices and not being stored in the cache of the media converter device, and redirect the another request to the another of the plurality of gateway devices.

2. The media converter device of claim 1, wherein the first network interface is communicatively coupled to the headend server via a first transmission network that includes a first network medium.

3. The media converter device of claim 2, wherein the second network interface is communicatively coupled to the one of the plurality of gateway devices via a second transmission network that includes a second network medium that is different than the first network medium.

4. The media converter device of claim 1, wherein the distribution controller is further configured to:

remove the content item from the cache when the content item is transmitted to the one of the plurality of gateway devices.

5. The media converter device of claim 1, wherein the distribution controller is further configured to:
determine that the content item is expected to be requested by at least one of the plurality of user devices that are communicatively coupled to the one of the plurality of gateway devices based at least in part on at least one content access history of the at least one of the plurality of user devices, wherein the plurality of user devices are located downstream from the one of the plurality of gateway devices.

6. The media converter device of claim 1, wherein the another request comprises another adaptive bit rate request for another segment of the another content item.

7. The media converter device of claim 1, wherein the distribution controller is configured to receive, from a third party server, an indication that the content item is expected to be requested by the number of the plurality of user devices.

8. A method, comprising:
receiving, by a media converter device and from a headend server, a content item and a first indication that the content item should be cached, wherein the headend server is located upstream from the media converter device;
storing the content item in a cache of the media converter device;
determining, based at least in part on a number of a plurality of user devices that are expected to request the content item, that the content item should be cached in one of a plurality of gateway devices that are located downstream from the media converter device, wherein the one of the plurality of gateway devices is communicatively coupled to the plurality of user devices;
transmitting, to the one of the plurality of gateway devices, the content item and a second indication that the content item should be cached at the one of the plurality of gateway devices;
intercepting a request for at least a portion of the content item, the request being intercepted from another of the plurality of gateway devices, the request comprising an adaptive bit rate request for a segment of the content item, and the request being addressed to the headend server;
redirecting the another of the plurality of gateway devices to retrieve the at least the portion of the content item from the one of the plurality of gateway devices in response to intercepting the request addressed to the headend server;
intercepting another request for another at least a portion of another content item, the another request being intercepted from the one of the plurality of gateway devices, the another request being addressed to the headend server, and the another at least the portion of the another content item being cached at the another of the plurality of gateway devices and not being stored in the cache of the media converter device; and
redirecting the another request to the another of the plurality of gateway devices.

9. The method of claim 8, wherein the media converter device is communicatively coupled to the headend server via a first transmission network that includes a first network medium.

10. The method of claim 9, wherein the media converter device is communicatively coupled to the one of the plurality of gateway devices via a second transmission network that includes a second network medium that is different than the first network medium.

11. The method of claim 8, further comprising:
removing the content item from the cache when the content item is transmitted to the one of the plurality of gateway devices.

12. The method of claim 8, further comprising:
determining that the content item is expected to be requested by at least one of the plurality of user devices that are communicatively coupled to the one of the plurality of gateway devices based at least in part on at least one content access history of the at least one of the plurality of user devices, wherein the plurality of user devices are located downstream from the one of the plurality of gateway devices.

13. The method of claim 8, wherein the another request comprises another adaptive bit rate request for another segment of the another content item.

14. The method of claim 8, further comprising:
receiving, from a third party server, an indication that the content item is expected to be requested by the number of the plurality of user devices.

15. A computer program product comprising instructions stored in a non-transitory computer-readable storage medium, the instructions comprising:
instructions to receive, by a media converter device and from a headend server, a content item and a first indication that the content item should be cached, wherein the headend server is located upstream from the media converter device;
instructions to store the content item in a cache of the media converter device;
instructions to determine, based at least in part on a number of a plurality of user devices that are expected to request the content item, that the content item should be cached in one of a plurality of gateway devices that are located downstream from the media converter device, wherein the one of the plurality of gateway devices is communicatively coupled to the plurality of user devices;
instructions to transmit, to the one of the plurality of gateway devices, the content item and a second indication that the content item should be cached at the one of the plurality of gateway devices;
instructions to intercept a request for at least a portion of the content item, the request being intercepted from another of the plurality of gateway devices, the request comprising an adaptive bit rate request for a segment of the content item, and the request being addressed to the headend server;
instructions to redirect the another of the plurality of gateway devices to retrieve the at least the portion of the content item from the one of the plurality of gateway devices in response to intercepting the request addressed to the headend server;
instructions to intercept another request for another at least a portion of another content item, the another request being intercepted from the one of the plurality of gateway devices, the another request being addressed to the headend server, and the another at least the portion of the another content item being cached at the another of the plurality of gateway devices and not being stored in the cache of the media converter device; and
instructions to redirect the another request to the another of the plurality of gateway devices.

16. The computer program product of claim 15, wherein the media converter device is communicatively coupled to the headend server via a first transmission network that includes a first network medium.

17. The computer program product of claim 15, wherein the instructions further comprise:
instructions to remove the content item from the cache when the content item is transmitted to the one of the plurality of gateway devices.

18. The computer program product of claim 15, wherein the instructions further comprise:
instructions to determine that the content item is expected to be requested by at least one of the plurality of user devices that are communicatively coupled to the one of the plurality of gateway devices based at least in part on at least one content access history of the at least one of the plurality of user devices, wherein the plurality of user devices are located downstream from the one of the plurality of gateway devices.

19. The computer program product of claim 15, wherein the another request comprises another adaptive bit rate request for another segment of the another content item.

20. The computer program product of claim 15, wherein the instructions further comprise:
instructions to receive, from a third party server, an indication that the content item is expected to be requested by the number of the plurality of user devices.

* * * * *